United States Patent
Dinkel et al.

(10) Patent No.: US 11,428,332 B2
(45) Date of Patent: Aug. 30, 2022

(54) VALVE ASSEMBLY WITH ANTI-TIP FEATURES

(71) Applicant: DELPHI TECHNOLOGIES IP LIMITED, St. Michael (BB)

(72) Inventors: Michael J. Dinkel, Penfield, NY (US); Salvador Plascencia, Chihuahua (MX)

(73) Assignee: Delphi Technologies IP Limited

( * ) Notice: Subject to any disclaimer, the term of this patent is extended or adjusted under 35 U.S.C. 154(b) by 0 days.

(21) Appl. No.: 17/124,546

(22) Filed: Dec. 17, 2020

(65) Prior Publication Data

US 2022/0196164 A1    Jun. 23, 2022

(51) Int. Cl.
*F16K 11/07*    (2006.01)
*F16K 27/04*    (2006.01)

(52) U.S. Cl.
CPC ........ *F16K 11/0708* (2013.01); *F16K 27/041* (2013.01)

(58) Field of Classification Search
CPC . F16K 11/0708; F16K 27/041; F16K 31/0613
See application file for complete search history.

(56) References Cited

U.S. PATENT DOCUMENTS

| | | | |
|---|---|---|---|
| 5,014,522 A | 5/1991 | Noji et al. | |
| 6,254,356 B1 | 7/2001 | Yamada et al. | |
| 6,497,251 B1 * | 12/2002 | Watson | F15B 13/0402 137/625.66 |
| 9,850,919 B2 * | 12/2017 | Zaehe | F15B 13/029 |
| 11,125,344 B1 * | 9/2021 | Hunter | F16K 31/0613 |
| 2013/0061958 A1 | 3/2013 | Muzquiz et al. | |
| 2013/0214187 A1 | 8/2013 | Moreno et al. | |
| 2014/0130916 A1 * | 5/2014 | Saeki | F04B 27/1804 137/625.48 |
| 2015/0068628 A1 * | 3/2015 | Iwa | F16K 31/0613 137/625.65 |
| 2017/0292623 A1 | 10/2017 | Becker | |
| 2018/0291888 A1 * | 10/2018 | Tonegawa | F16K 31/0624 |
| 2019/0195383 A1 * | 6/2019 | Nasser | F16K 31/082 |
| 2021/0207725 A1 * | 7/2021 | Zahe | F15B 13/0402 |
| 2021/0262494 A1 * | 8/2021 | Slattery | F15B 13/0435 |

FOREIGN PATENT DOCUMENTS

KR    101303694 B1    8/2013

* cited by examiner

*Primary Examiner* — Paul J Gray
(74) *Attorney, Agent, or Firm* — Joshua M. Haines (57) ABSTRACT

A valve assembly includes a valve housing having a first port, a second port, and a third port. A valve member within the valve housing is moveable therein to alter fluid communication between the first and second ports. The valve housing includes a first annular groove such that a first sealing ring is provided in the first annular groove, thereby sealing the first port from the second port when installed in a receiving bore. The valve housing also includes a second annular groove such that a second sealing ring is provided in the second annular groove, thereby sealing the second port from the third port in the receiving bore. The valve housing also includes a first anti-tip flange extending radially outward to a greater extent than the first annular groove and a second anti-tip flange extending radially outward to a greater extent than the second annular groove.

19 Claims, 6 Drawing Sheets

VALVE ASSEMBLY WITH ANTI-TIP FEATURES

TECHNICAL FIELD OF INVENTION

The present invention relates to a valve assembly; more particularly to a valve assembly which includes features which preventing tipping of the valve assembly during installation and removal from a receiving bore.

BACKGROUND OF INVENTION

Control valves are widely used to control fluid flow and pressure between multiple ports. In one particular arrangement, a receiving bore extends into a body and the control valve is inserted into the receiving bore. Two or more passages extend through the body and intersect with the receiving bore such that the control valve is designed to control fluid flow and pressure between the passages. The passages may include a supply passage, a control passage, and a vent or exhaust passage where one or more of these passages intersect with the peripheral wall of the receiving bore and the passages are spaced apart axially within the receiving bore. In order to prevent communication between the passages, the control valve includes axially-spaced sealing rings on an outer periphery thereof which seal against the inner periphery of the receiving bore. Since one or more of the passages intersect the peripheral wall of the receiving bore, it is a concern that the sealing rings may be damaged as they pass across the passages during installation or removal of the control valve since the passages create sharp edges where they intersect with the receiving bore. In order to minimize the potential for damage of the sealing rings, it is known to make the receiving bore stepped such that the bore has discrete sections of decreasing diameter with the smallest diameter being at the bottom of the receiving bore, thereby providing the passages at different diameters of the receiving bore. The outer periphery of the control valve is similarly stepped such that the sealing rings are placed at different diameters. Consequently, the sealing rings are able to pass by the passages without coming into contact with the sharp edges formed by the intersection of the passages and the receiving bore so long as the control valve is not allowed to tip relative to the receiving bore during installation and removal. One such control valve is illustrated in U.S. Pat. No. 5,014,522 to Noji et al. However, it may be difficult to avoid tipping of the control valve during installation or removal and this tipping may allow one or more of the sealing rings to be passed over the sharp edges, thereby providing the potential to cause damage to one or more sealing rings which may affect the ability of the sealing rings to provide their desired function. While some control valves may avoid potential damage to the sealing rings by being designed with significant differences in diameter between adjacent sealing ring, for example by providing no axial overlap in adjacent sealing rings, such an arrangement eliminates radial compactness which may be undesirable when packaging space is minimal.

What is needed is a control valve which minimizes or eliminates one or more of the shortcomings set forth above.

SUMMARY OF THE INVENTION

Briefly described, a valve assembly is configured to be received within a receiving bore which extends along a receiving bore axis from an outer surface to a receiving bore inner end, the receiving bore being stepped in diameter such that a first diameter which is proximal to the receiving bore inner end is smaller in diameter than a second diameter which is axially between the first diameter and the outer surface and such that a third diameter which is axially between the second diameter and the outer surface is larger in diameter than the second diameter. The valve assembly includes a valve housing which is configured to be received within the receiving bore and which extends along a valve housing axis from a valve housing inner end, which is proximal to the receiving bore inner end when the valve housing is in the receiving bore, to a valve housing outer end which is distal from the receiving bore inner end when the valve housing is in the receiving bore, the valve housing having a first port, a second port, and a third port. The valve assembly also includes a valve member within the valve housing which is moveable therein, thereby providing different levels of fluid communication between the first port and the second port. The valve housing includes a first annular groove on an outer periphery of the valve housing such that the first annular groove is centered about the valve housing axis and such that a first sealing ring is provided in the first annular groove and configured to engage the first diameter, thereby sealing the first port from the second port at the outer periphery, the first annular groove being bounded axially by a first lower annular groove flange and a first upper annular groove flange; a second annular groove on the outer periphery such that the second annular groove is centered about the valve housing axis and such that a second sealing ring is provided in the second annular groove and configured to engage the second diameter, thereby sealing the second port from the third port at the outer periphery, the second annular groove being bounded axially by a second lower annular groove flange and a second upper annular groove flange; a first anti-tip flange which extends radially outward from the outer periphery to a greater extent than the first lower annular groove flange and the first upper annular groove flange, the first anti-tip flange being located axially between the first annular groove and the second annular groove; and a second anti-tip flange which extends radially outward from the outer periphery to a greater extent than the second lower annular groove flange and the second upper annular groove flange, the second anti-tip flange being located axially between the first annular groove and the valve housing outer end. The valve assembly with first anti-tip flange and second anti-tip flange as described herein minimizes tipping of the valve assembly relative to the receiving bore, thereby minimizing the likelihood of damage to sealing rings when the valve assembly is being inserted into the receiving bore or being removed from the receiving bore. Furthermore, the first anti-tip flange and second anti-tip flange do not require modification to the receiving bore, and therefore the valve assembly can be used as a direct replacement to the prior valve assembly which did not include the first anti-tip flange and second anti-tip flange.

BRIEF DESCRIPTION OF DRAWINGS

This invention will be further described with reference to the accompanying drawings in which.

DETAILED DESCRIPTION OF INVENTION

In accordance with a preferred embodiment of this disclosure and referring initially to FIGS. 1-4, a solenoid-actuated control valve 10 is shown, hereinafter referred to as valve assembly 10. Valve assembly 10 is configured to be received within a receiving bore 12, by way of non-limiting example only, of a cylinder head 13 of an internal combustion engine, such that receiving bore 12 is centered about, and extends along, a receiving bore axis 12*a*. Valve assembly 10 includes a hydraulic subassembly 14 in fluid communication with a fluid source 16 and a working device 18. As illustrated herein, fluid source 16 may be, by way of non-limiting example only, a reservoir and pump. Working device 18 may be, by way of non-limiting example only, a multi-step valve train device for an internal combustion engine of a motor vehicle. Valve assembly 10 also includes solenoid subassembly 20 which is connected to hydraulic subassembly 14 and which controls fluid communication from fluid source 16 through hydraulic subassembly 14 to working device 18 based on an electric current which is supplied by an electric current source (not shown).

Figure 4:
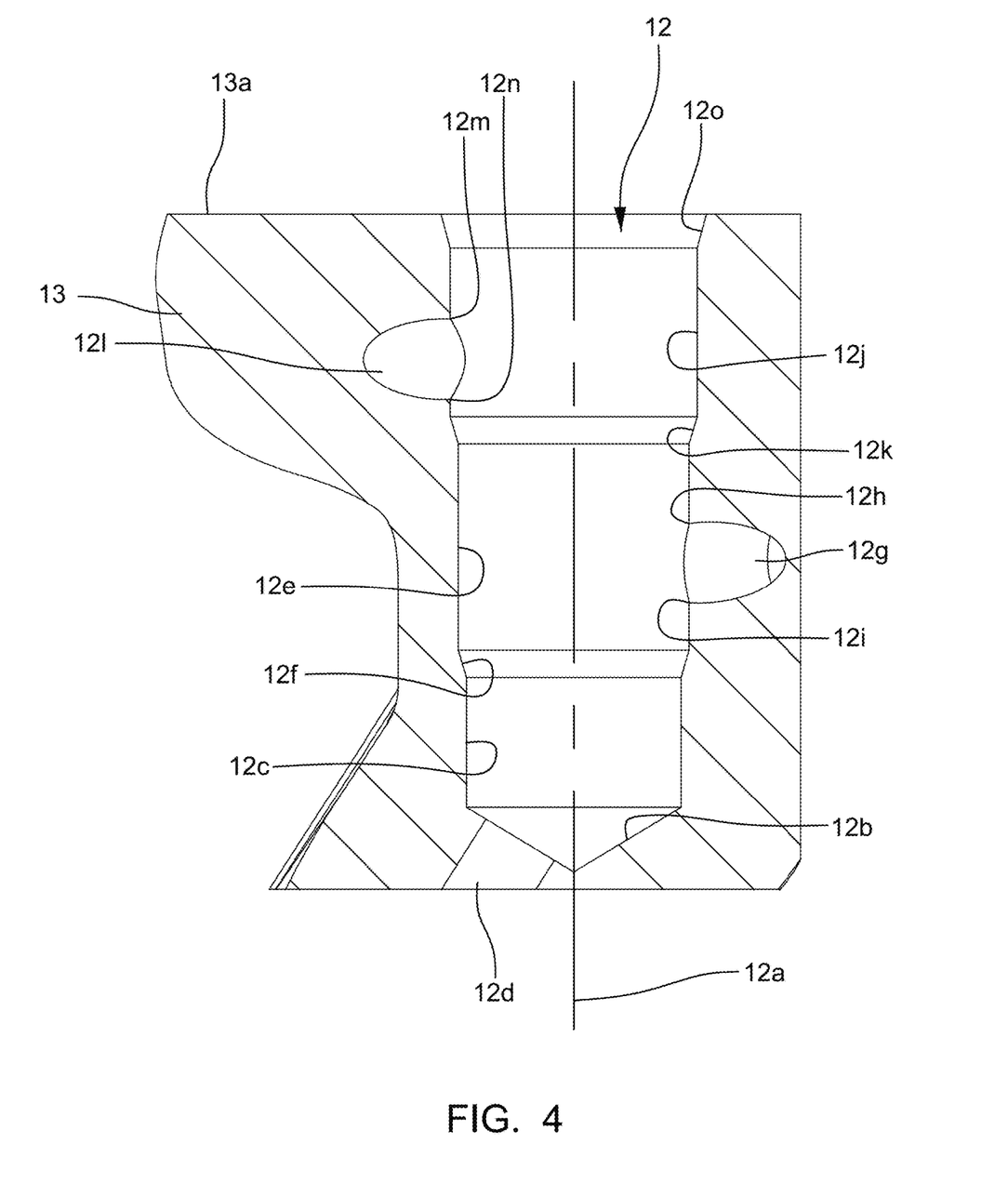
FIG. 4 is an axial cross-sectional view of only the receiving bore.

Now with particular reference to FIG. 4, receiving bore 12 extends into cylinder head 13 from an outer surface 13*a* to a receiving bore inner end 12*b* such that receiving bore 12 is stepped in diameter. A first diameter 12*c* is proximal to receiving bore inner end 12*b* and a receiving bore supply passage 12*d* opens into one or both of receiving bore inner end 12*b* and first diameter 12*c* such that receiving bore supply passage 12*d* is in fluid communication with fluid source 16. A second diameter 12*e* of receiving bore 12 is located axially between first diameter 12*c* and outer surface 13*a* such that second diameter 12*e* is larger in diameter than first diameter 12*c*. As illustrated in the figures, a first chamfer 12*f* may join first diameter 12*c* to second diameter 12*e* such that first chamfer 12*f* is inclined relative to receiving bore axis 12*a*. A receiving bore control passage 12*g*, which is transverse to receiving bore axis 12*a*, intersects with second diameter 12*e* and extends axially from a control passage uppermost edge 12*h*, which is proximal to outer surface 13*a*, to a control passage lowermost edge 12*i*, which is distal from outer surface 13*a*. A third diameter 12*j* of receiving bore 12 is located axially between second diameter 12*e* and outer surface 13*a* such that third diameter 12*j* is larger in diameter than second diameter 12*e*. As illustrated in the figures, a second chamfer 12*k* may join second diameter 12*e* to third diameter 12*j* such that second chamfer 12*k* is inclined relative to receiving bore axis 12*a*. A receiving bore exhaust passage 12*l*, which is transverse to receiving bore axis 12*a*, intersects with third diameter 12*j* and extends axially from a exhaust passage uppermost edge 12*m*, which is proximal to outer surface 13*a*, to a exhaust passage lowermost edge 12*n*, which is distal from outer surface 13*a*. As illustrated in the figures, a third chamfer 12*o* may join third diameter 12*j* to outer surface 13*a* such that third chamfer 12*o* is inclined relative to receiving bore axis 12*a*.

Figure 1:
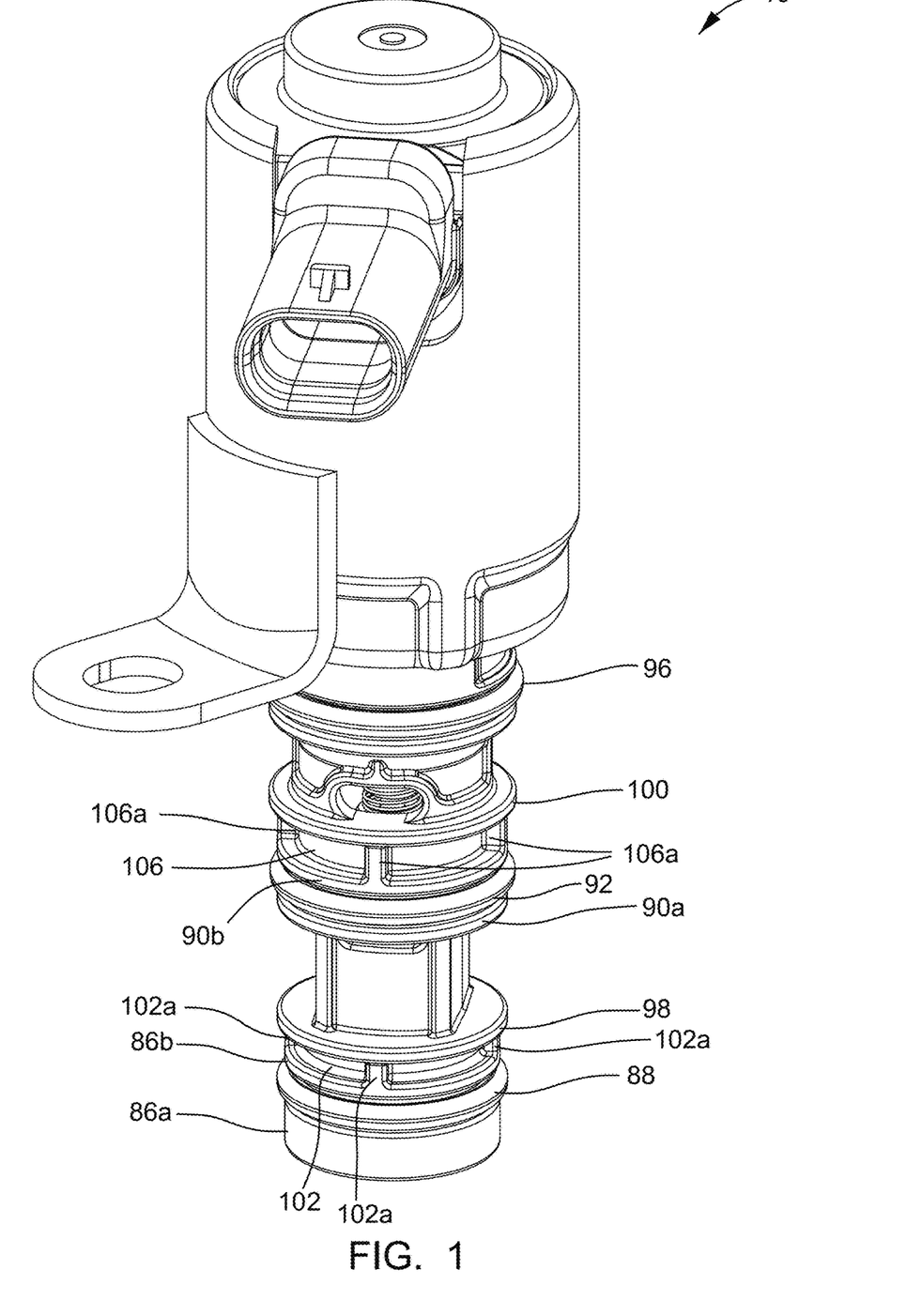
FIG. 1 is an isometric view of a valve assembly in accordance with the present disclosure.
Figure 2:
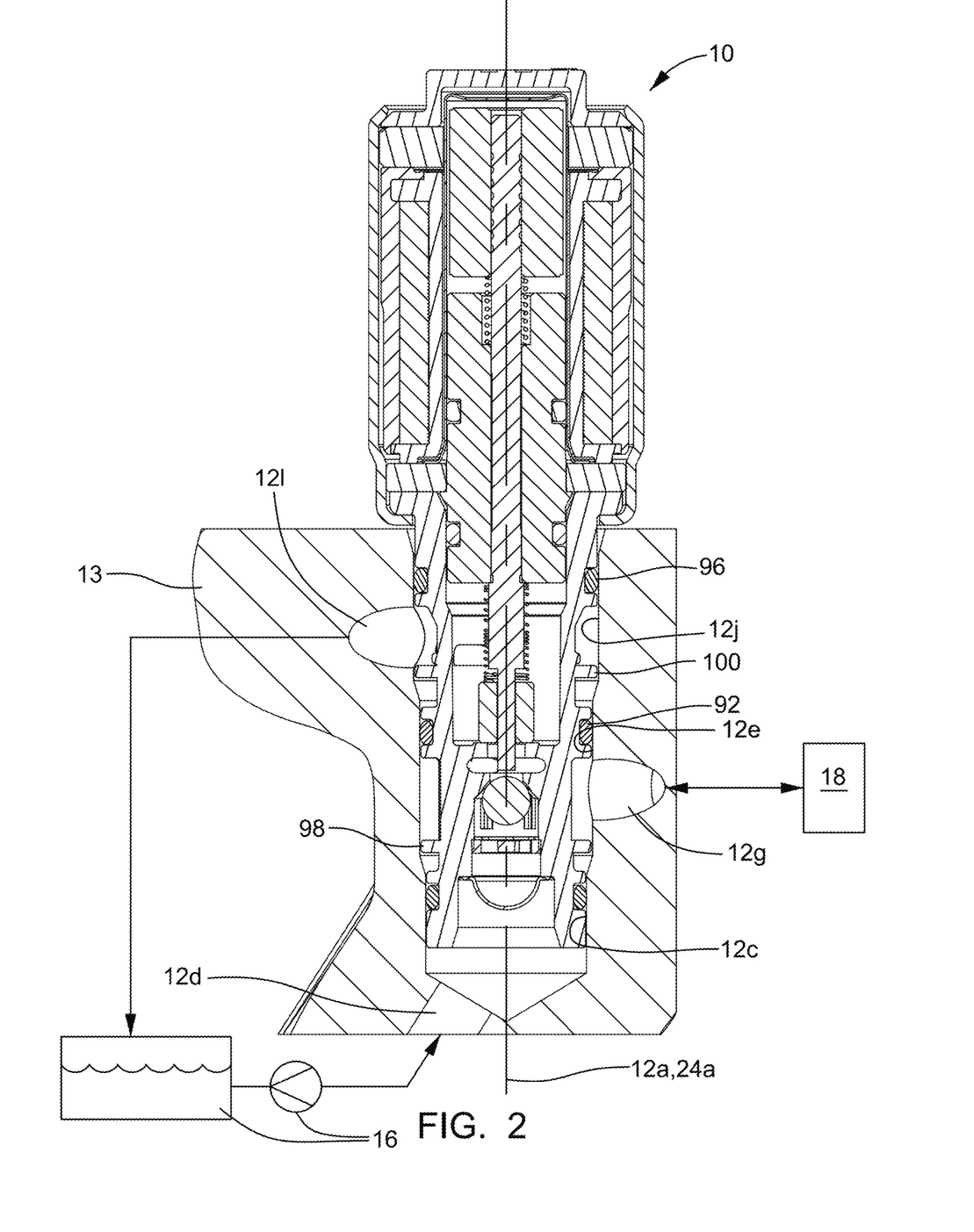
FIG. 2 is an axial cross-sectional view of the valve assembly installed in a receiving bore.
Figure 3:
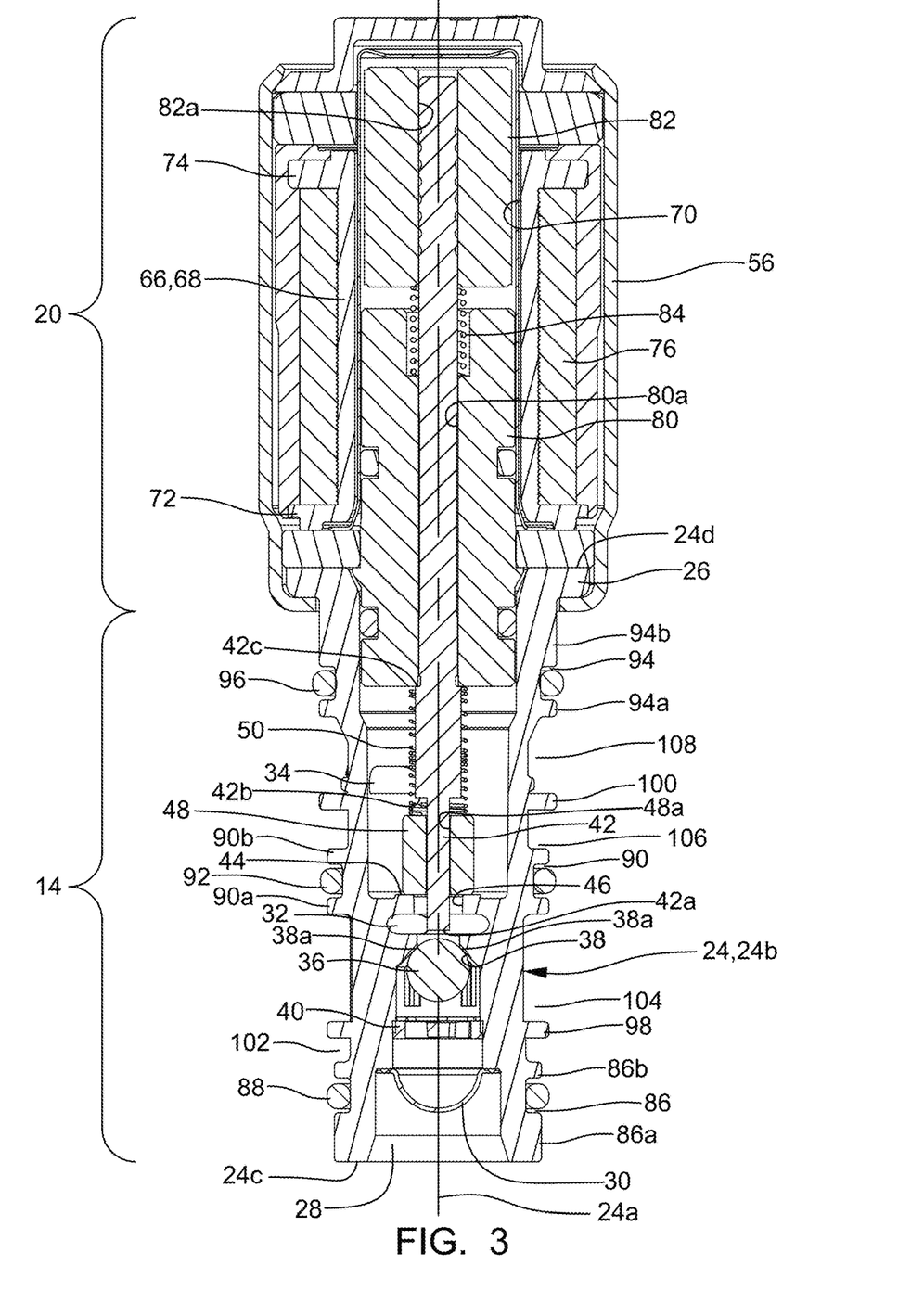
FIG. 3 is an axial cross-sectional view of only the valve assembly.

Now with particular reference to FIGS. 1-3, hydraulic subassembly 14 includes a valve housing 24 which may be made, by way of non-limiting example only, from plastic by an injection molding process. Valve housing 24 extends along a valve housing axis 24*a* and includes an attachment flange 26 at one axial end thereof which is used to attach hydraulic subassembly 14 to solenoid subassembly 20. Valve housing 24 also includes an inlet port 28 located in the axial end of valve housing 24 which is distal from attachment flange 26. Inlet port 28 is in constant fluid communication with fluid source 16 when valve housing 24 is fully installed within receiving bore 12 such that inlet port 28 serves to communicate fluid into valve assembly 10. A filter 30 may be provided in inlet port 28 in order to prevent foreign matter present in the fluid from reaching the working members, i.e. valve members and seats, of hydraulic subassembly 14 and also from reaching working device 18. Valve housing 24 also includes a control port 32 extending radially outward from valve housing 24. Control port 32 is in constant fluid communication with working device 18 when valve housing 24 is fully installed within receiving bore 12 and is in variable fluid communication with inlet port 28 based on input from solenoid subassembly 20. Control port 32 serves as an outlet which discharges fluid from valve assembly 10 by supplying fluid to working device 18. Valve housing 24 also includes an exhaust port 34 which is in variable fluid communication with control port 32 based on input from solenoid subassembly 20.

As shown, valve housing 24 includes annular grooves on an outer periphery 24*b* thereof which are centered about valve housing axis 24*a*. Valve housing 24 extends along valve housing axis 24*a* from a valve housing inner end 24*c*, which is proximal to receiving bore inner end 12*b* when valve housing 24 is in receiving bore 12, to a valve housing outer end 24*d*, which is distal from receiving bore inner end 12*b* when valve housing 24 is in receiving bore 12. These grooves receive respective sealing rings which provide a seal with receiving bore 12 and prevent fluid leakage between inlet port 28, control port 32, and exhaust port 34 and also prevent leakage of fluid from the intended hydraulic circuit. These annular grooves and O-rings will be described in greater detail later.

Hydraulic subassembly 14 also includes a supply valve member shown as a ball 36 which is located within inlet port 28 and which is selectively seated and unseated with a supply valve seat 38 that may be defined by valve housing 24. Supply valve seat 38 is annular, centered about valve housing axis 24*a*, and formed between control port 32 and inlet port 28 to be smaller in diameter than ball 36. In order to retain ball 36 within inlet port 28, a ball retainer 40 may be provided. Ball retainer 40 may be secured, for example by press fit or welding, within a portion of inlet port 28 and ball retainer 40 includes one or more apertures therethrough that are sufficiently large to allow desired flow therethrough while still retaining ball 36 between supply valve seat 38 and ball retainer 40.

Hydraulic subassembly 14 is also provided with a poppet rod 42 made of a non-magnetic material in order to transfer linear motion produced by solenoid subassembly 20 to ball 36 to selectively seat and unseat ball 36 with supply valve seat 38. Poppet rod 42 is centered about valve housing axis 24*a* and is sized to extend through supply valve seat 38 such that a clearance is formed radially outward of poppet rod 42 to allow fluid communication radially between valve housing 24 and poppet rod 42 from inlet port 28 to control port 32. When ball 36 is to be unseated with supply valve seat 38, poppet rod tip 42*a* contacts ball 36 and urges ball 36 away from supply valve seat 38, i.e. downward as oriented in the figures. In this way, ball 36 moves between a first ball position and a second ball position such that the first ball position provides a greater restriction between inlet port 28 and control port 32 as compared to the second ball position. In the embodiment shown, the first ball position provides restricted fluid communication between inlet port 28 and control port 32 through grooves 38a formed in supply valve seat 38 in order to provide continuous fluid flow or pressure to working device 18 in order to keep air purged between control port 32 and working device 18 or to provide lubrication to working device 18. However, it should be understood that the first ball position may alternatively prevent fluid communication between inlet port 28 and control port 32, by omitting grooves 38a, in other applications.

Hydraulic subassembly 14 is also provided with an exhaust seat 44 which is disposed within valve housing 24 axially between control port 32 and exhaust port 34. Exhaust seat 44 is annular in shape, thereby defining an exhaust aperture 46 extending axially therethrough and coaxial with valve housing axis 24a. Exhaust aperture 46 is sized to allow poppet rod 42 to pass therethrough with sufficient radial clearance with poppet rod 42 to allow fluid communication radially between exhaust aperture 46 and poppet rod 42 from control port 32 to exhaust port 34. An exhaust valve member 48 is located between exhaust aperture 46 and exhaust port 34 and circumferentially surrounds poppet rod 42. Exhaust valve member 48 is sized to be larger in diameter than exhaust aperture 46 and includes an exhaust valve member bore 48a extending axially therethrough through which poppet rod 42 passes. Exhaust valve member bore 48a is sized to allow poppet rod 42 and exhaust valve member 48 to move axially independent of one another while preventing fluid from passing between the interface of poppet rod 42 and exhaust valve member bore 48a. Poppet rod 42 includes a first poppet rod shoulder 42b which faces toward exhaust valve member 48 such that first poppet rod shoulder 42b is larger in diameter than exhaust valve member bore 48a. In this way, first poppet rod shoulder 42b limits the extent to which poppet rod 42 travels downward as oriented in the figures and holds exhaust valve member 48 in against exhaust seat 44. Conversely, a second poppet rod shoulder 42c limits the extent to which poppet rod 42 travels upward as oriented in the figures. An exhaust valve spring 50 is provided to bias exhaust valve member 48 toward exhaust seat 44 as will be described in greater detail later. Exhaust valve member 48 is selectively seated with exhaust seat 44 in order to prevent fluid communication between control port 32 and exhaust port 34 and is selectively unseated with exhaust seat 44 in order to permit fluid communication between control port 32 and exhaust port 34 as will also be described in greater detail later.

Solenoid subassembly 20 includes a solenoid housing 56 which is made of a magnetic metal and which is hollow. Within solenoid housing 56 is disposed a spool 66 which is made of a material which does not conduct electricity, for example, plastic. Spool 66 includes a spool cylinder 68 which is centered about valve housing axis 24a and which is hollow to define a spool bore 70 which extends axially through spool cylinder 68 centered about valve housing axis 24a. Spool 66 also includes spool rims 72, 74 which extend radially outward from the ends of spool cylinder 68. Spool rim 72 extends radially outward from the end of spool cylinder 68 which is proximal to hydraulic subassembly 14 while spool rim 74 extends radially outward from the end of spool cylinder 68 which is distal from hydraulic subassembly 14. Electrically conductive wire, i.e. insulated magnet wire, is wound around spool cylinder 68 about valve housing axis 24a between spool rims 72, 74 to form coil 76. Opposite ends of coil 76 are connected to respective terminals of the electric current source to selectively supply an electric current to coil 76.

Solenoid subassembly 20 also includes a pole piece 80 made of a magnetic material. Pole piece 80 is tubular, thereby defining pole piece bore 80a extending axially therethrough such that pole piece bore 80a is centered about valve housing axis 24a. Pole piece bore 80a is sized to closely guide poppet rod 42, thereby allowing poppet rod 42 to move freely axially therewithin while substantially preventing radial movement of poppet rod 42 therewithin.

Solenoid subassembly 20 also includes an armature 82 which is made of a magnetic material, is centered about valve housing axis 24a, and is located within spool bore 70. Armature 82 includes an armature bore 82a extending axially therethrough such that armature bore 82a is centered about valve housing axis 24a. The end of poppet rod 42 that is distal from hydraulic subassembly 14 extends into armature bore 82a and is fixed therewithin, by way of non-limiting example only, with an interference fit. A solenoid return spring 84 is positioned between pole piece 80 and armature 82 and biases armature 82 away from pole piece 80. In operation, an electric current is applied to coil 76, armature 82 is magnetically attracted to pole piece 80, thereby causing poppet rod 42 to move downward, as oriented in the figures, thereby holding ball away from 36 away from supply valve seat 38 which allows full pressure from fluid source 16 to be supplied to control port 32. Furthermore, exhaust valve member 48 is held against exhaust seat 44, thereby preventing fluid from flowing to exhaust port 34. Conversely, when the electric current to coil 76 is ceased, the magnetic attraction between pole piece 80 and armature 82 is also ceased, thereby causing solenoid return spring 84 to move armature 82 and poppet rod 42 to move upward as oriented in the figures which allows ball 36 to seat against supply valve seat 38 under the force of pressure from fluid source 16. Furthermore, exhaust valve member 48 is no longer held against exhaust seat 44, thereby allowing fluid to pass to exhaust port 34 when the pressure at control port 32 is sufficiently high to overcome the force of exhaust valve spring 50. In this way, exhaust valve member 48 and exhaust valve spring 50 regulate the pressure at control port 32.

As mentioned previously, valve housing 24 includes annular grooves on outer periphery 24b which receive sealing which provide a seal with receiving bore 12 and prevents fluid leakage between inlet port 28, control port 32, and exhaust port 34 and also prevent leakage of fluid from the intended hydraulic circuit. These features will now be described in greater detail in the paragraphs that follow.

A first annular groove 86 is provided on outer periphery 24b such that first annular groove 86 is centered about valve housing axis 24a and such that a first sealing ring 88 is provided in first annular groove 86. First sealing ring 88 is compressed radially between valve housing 24 and first diameter 12c, thereby preventing fluid communication between receiving bore supply passage 12d and receiving bore control passage 12g along the inner periphery of receiving bore 12. First annular groove 86 is bounded axially by a first lower annular groove flange 86a, which is proximal to valve housing inner end 24c, and by a first upper annular groove flange 86b, which is distal from valve housing inner end 24c. First lower annular groove flange 86a and first upper annular groove flange 86b are each centered about valve housing axis 24a and preferably have a common outer diameter.

A second annular groove 90 is provided on outer periphery 24b such that second annular groove 90 is centered about valve housing axis 24a and such that a second sealing ring 92 is provided in second annular groove 90. Second sealing ring 92 is compressed radially between valve housing 24 and second diameter 12e at a location axially between receiving bore control passage 12g and receiving bore exhaust passage 121, thereby preventing fluid communication between receiving bore control passage 12g and receiving bore exhaust passage 121. Second annular groove 90 is bounded axially by a second lower annular groove flange 90a, which is proximal to valve housing inner end 24c, and by a second upper annular groove flange 90b, which is distal from valve housing inner end 24c. Second lower annular groove flange 90a and second upper annular groove flange 90b are each centered about valve housing axis 24a and preferably have a common outer diameter. Furthermore, second annular groove 90 has an inner diameter which is larger than an inner diameter than first annular groove 86. Similarly, second lower annular groove flange 90a and second upper annular groove flange 90b are larger in diameter than first lower annular groove flange 86a and first upper annular groove flange 86b. While second annular groove 90 has an inner diameter which is larger than an inner diameter than first annular groove 86, it should be noted that a portion of first sealing ring 88 and second sealing ring 92 are axially aligned, i.e. a line parallel to valve housing axis 24a passes through both first sealing ring 88 and second sealing ring 92 which is important to keeping valve assembly 10 radially compact.

A third annular groove 94 is provided on outer periphery 24b such that third annular groove 94 is centered about valve housing axis 24a and such that a third sealing ring 96 is provided in third annular groove 94. Third sealing ring 96 is compressed radially between valve housing 24 and third diameter 12j at a location axially between receiving bore exhaust passage 121 and outer surface 13a, thereby preventing fluid communication between receiving bore exhaust passage 121 and the outside of receiving bore 12. Third annular groove 94 is bounded axially by a third lower annular groove flange 94a, which is proximal to valve housing inner end 24c, and by a third upper annular groove flange 94b, which is distal from valve housing inner end 24c. Third lower annular groove flange 94a and third upper annular groove flange 94b are each centered about valve housing axis 24a and preferably have a common outer diameter. Furthermore, third annular groove 94 has an inner diameter which is larger than the inner diameter of second annular groove 90. Similarly, third lower annular groove flange 94a and third upper annular groove flange 94b are larger in diameter than second lower annular groove flange 90a and second upper annular groove flange 90b. While third annular groove 94 has an inner diameter which is larger than the inner diameter of second annular groove 90, it should be noted that a portion of second sealing ring 92 and third sealing ring 96 are axially aligned, i.e. a line parallel to valve housing axis 24a passes through both second sealing ring 92 and third sealing ring 96 which is important to keeping valve assembly 10 radially compact. Furthermore, it is most preferable to have portions of each of first sealing ring 88, second sealing ring 92, and third sealing ring 96 all axially aligned, i.e. a line parallel to valve housing axis 24a passes through each of first sealing ring 88, second sealing ring 92, and third sealing ring 96, which is important to keeping valve assembly 10 radially compact.

In order to minimize or eliminate damage to first sealing ring 88 and second sealing ring 92 when valve assembly 10 is being inserted into, or being removed from, receiving bore 12, valve housing 24 also includes a first anti-tip flange 98 and a second anti-tip flange 100. First anti-tip flange 98 and second anti-tip flange 100 will be described in greater detail in the paragraphs that follow with continued reference to FIGS. 1-4 and now with additional reference to FIGS. 5 and 6.

First anti-tip flange 98 extends radially outward from outer periphery 24b such that first anti-tip flange 98 is located axially between first annular groove 86 and second annular groove 90. Furthermore, when first sealing ring 88 is aligned with control passage lowermost edge 12i during installation or removal (FIG. 5), first anti-tip flange 98 is radially aligned with receiving bore control passage 12g; when first sealing ring 88 is aligned with control passage uppermost edge 12h during installation or removal (FIG. 6), first anti-tip flange 98 is positioned within second diameter 12e between receiving bore control passage 12g and receiving bore exhaust passage 121; and when valve assembly 10 is fully inserted into receiving bore 12 (FIG. 2), first anti-tip flange 98 is positioned within second diameter 12e between receiving bore control passage 12g and first diameter 12c. First anti-tip flange 98 extends radially outward to a greater extent than first lower annular groove flange 86a and first upper annular groove flange 86b and preferably extends radially outward to at least the same extent as second lower annular groove flange 90a and second upper annular groove flange 90b in order to maximize effectiveness by minimizing tipping of valve assembly 10 relative to receiving bore axis 12a during installation and removal of valve assembly 10. First anti-tip flange 98 may be annular in shape as shown in the figures or may alternatively be segmented circumferentially. First anti-tip flange 98 is spaced axially apart from first upper annular groove flange 86b and from second lower annular groove flange 90a, thereby defining a first space 102 between first anti-tip flange 98 and first upper annular groove flange 86b and also defining a second space 104 between first anti-tip flange 98 and second lower annular groove flange 90a. Control port 32 is located within second space 104 and is aligned with receiving bore control passage 12g. Due to the proximity of first space 102 to first annular groove 86 and similarity in size, first space 102 includes a plurality of ribs 102a (three are visible in FIG. 1) which are circumferentially spaced and extend axially from first upper annular groove flange 86b to first anti-tip flange 98 such that ribs 102a extend radially outward into first space 102 to the outer diameter of first upper annular groove flange 86b. If first sealing ring 88 was mistakenly assembled over first space 102, ribs 102a would position first sealing ring 88 radially outward sufficiently far so as to prevent valve assembly 10 from being installed within receiving bore 12.

Second anti-tip flange 100 extends radially outward from outer periphery 24b such that second anti-tip flange 100 is located axially between second annular groove 90 and third annular groove 94. Furthermore, when second sealing ring 92 is aligned with exhaust passage lowermost edge 12n during installation or removal (FIG. 5), second anti-tip flange 100 is positioned within third diameter 12j axially between exhaust passage uppermost edge 12m and outer surface 13a; when second sealing ring 92 is aligned with exhaust passage uppermost edge 12m during installation or removal (FIG. 6), second anti-tip flange 100 is positioned axially between exhaust passage uppermost edge 12m and outer surface 13a; and when valve assembly 10 is fully inserted into receiving bore 12 (FIG. 2), second anti-tip flange 100 is positioned within third diameter 12j between receiving bore control passage 12g and receiving bore exhaust passage 121. Second anti-tip flange 100 extends radially outward to a greater extent than second lower annular groove flange 90a and second upper annular groove flange 90b and preferably extends radially outward to at least the same extent as third lower annular groove flange 94a and third upper annular groove flange 94b in order to maximize effectiveness by minimizing tipping of valve assembly 10 relative to receiving bore axis 12a during installation and removal of valve assembly 10. Second anti-tip flange 100 may be annular in shape as shown in the figures or may alternatively be segmented circumferentially. Second anti-tip flange 100 is spaced axially apart from second upper annular groove flange 90b and from third lower annular groove flange 94a, thereby defining a third space 106 between second anti-tip flange 100 and second upper annular groove flange 90b and also defining a fourth space 108 between second anti-tip flange 100 and third lower annular groove flange 94a. Exhaust port 34 is located within fourth space 108 and is aligned with receiving bore exhaust passage 121. Due to the proximity of third space 106 to second annular groove 90 and similarity in size, third space 106 includes a plurality of ribs 106a (three are visible in FIG. 1) which are circumferentially spaced and extend axially from second upper annular groove flange 90b to second anti-tip flange 100 such that ribs 106a extend radially outward into third space 106 to the outer diameter of second upper annular groove flange 90b. If second sealing ring 92 was mistakenly assembled over third space 106, ribs 106a would position second sealing ring 92 radially outward sufficiently far so as to prevent valve assembly 10 from being installed within receiving bore 12.

Figure 5:
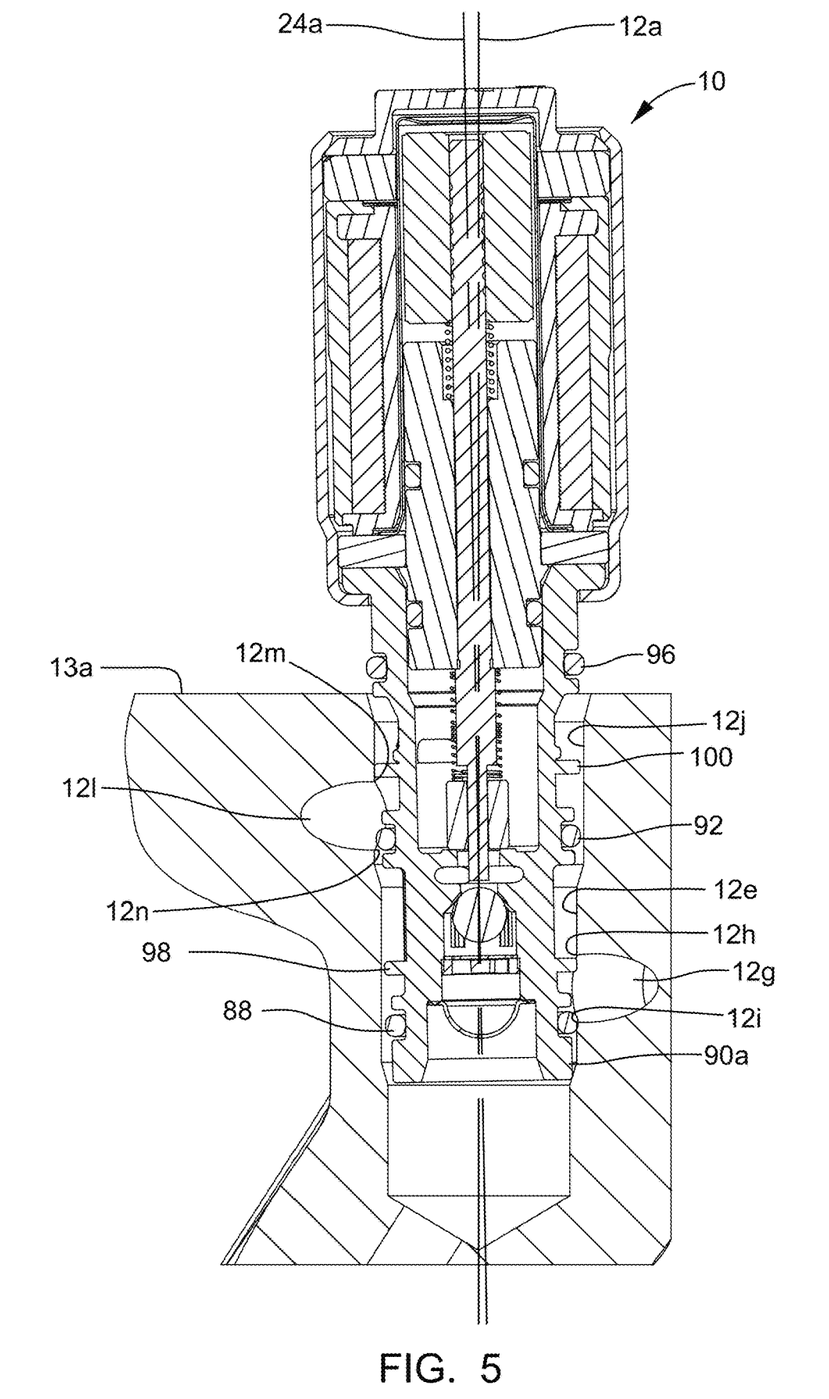
FIGS. 5 and 6 show the valve assembly in two different positions during assembly into the receiving bore or removal from the receiving bore.
Figure 6:
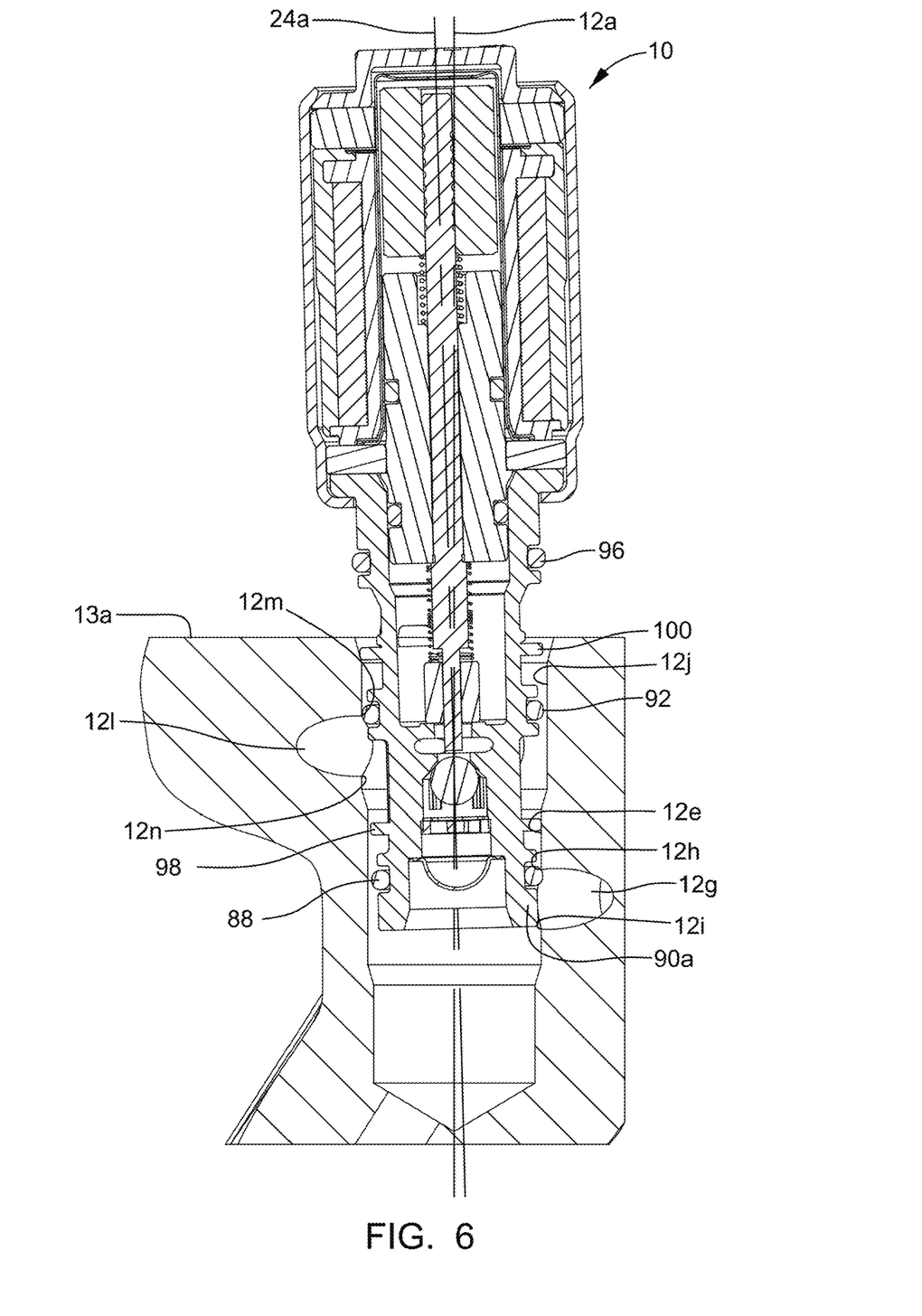

Reference will now be made specifically to FIGS. 5 and 6 which represent conditions in which the valve assembly 10 is installed into receiving bore 12 and removed from receiving bore 12 when sealing rings 88, 92, 96 are most susceptible to being damaged. As can be seen in FIG. 5, which represents a condition in which first sealing ring 88 and second sealing ring 92 are moving toward control passage lowermost edge 12i and exhaust passage lowermost edge 12n respectively when valve assembly 10 is being inserted into receiving bore 12, and thus susceptible to being damaged by the sharp edges of control passage lowermost edge 12i and exhaust passage lowermost edge 12n, tipping of receiving bore axis 12a relative to valve housing axis 24a is limited by second lower annular groove flange 90a and second anti-tip flange 100, thereby minimizing or eliminating the interaction between first sealing ring 88 and second sealing ring 92 with control passage lowermost edge 12i and exhaust passage lowermost edge 12n respectively. Furthermore, as can be seen in FIG. 6, which represents a condition in which first sealing ring 88 and second sealing ring 92 are moving toward control passage uppermost edge 12h and exhaust passage uppermost edge 12m respectively when valve assembly 10 is being removed from receiving bore 12, and thus susceptible to being damaged by the sharp edges of control passage uppermost edge 12h and exhaust passage uppermost edge 12m, tipping of receiving bore axis 12a relative to valve housing axis 24a is limited by first anti-tip flange 98 and second anti-tip flange 100, thereby minimizing or eliminating the interaction between first sealing ring 88 and second sealing ring 92 with control passage uppermost edge 12h and exhaust passage uppermost edge 12m respectively.

Valve assembly 10 with first anti-tip flange 98 and second anti-tip flange 100 as described herein minimizes tipping of valve assembly 10 relative to receiving bore 12, thereby minimizing the likelihood of damage to sealing rings 88, 92, 96 when valve assembly 10 is being inserted into receiving bore 12 or being removed from receiving bore 12. Furthermore, the first anti-tip flange 98 and second anti-tip flange 100 do not require modification to receiving bore 12, and therefore valve assembly 10 can be used as a direct replacement to the prior art valve assembly which did not include first anti-tip flange 98 and second anti-tip flange 100.

While this invention has been described in terms of preferred embodiments thereof, it is not intended to be so limited, but rather only to the extent set forth in the claims that follow.

We claim:

1. A valve assembly configured to be received within a receiving bore which extends along a receiving bore axis from an outer surface to a receiving bore inner end, said receiving bore being stepped in diameter such that a first diameter which is proximal to said receiving bore inner end is smaller in diameter than a second diameter which is axially between said first diameter and said outer surface and such that a third diameter which is axially between said second diameter and said outer surface is larger in diameter than said second diameter, said valve assembly comprising:

a valve housing which is configured to be received within said receiving bore and which extends along a valve housing axis from a valve housing inner end, which is proximal to said receiving bore inner end when said valve housing is in said receiving bore, to a valve housing outer end which is distal from said receiving bore inner end when said valve housing is in said receiving bore, said valve housing having a first port, a second port, and a third port;

a valve member within said valve housing which is moveable therein, thereby providing different levels of fluid communication between said first port and said second port;

wherein said valve housing also includes:

a first annular groove on an outer periphery of said valve housing such that said first annular groove is centered about said valve housing axis and such that a first sealing ring is provided in said first annular groove and configured to engage said first diameter, thereby sealing said first port from said second port at said outer periphery, said first annular groove being bounded axially by a first lower annular groove flange and a first upper annular groove flange;

a second annular groove on said outer periphery such that said second annular groove is centered about said valve housing axis and such that a second sealing ring is provided in said second annular groove and configured to engage said second diameter, thereby sealing said second port from said third port at said outer periphery, said second annular groove being bounded axially by a second lower annular groove flange and a second upper annular groove flange; and a first anti-tip flange which extends radially outward from said outer periphery to a greater extent than said first lower annular groove flange and said first upper annular groove flange, said first anti-tip flange being located axially between said first annular groove and said second annular groove; and a second anti-tip flange which extends radially outward from said outer periphery to a greater extent than said second lower annular groove flange and said second upper annular groove flange, said second anti-tip flange being located axially between said first annular groove and said valve housing outer end wherein a first passage is in fluid communication with said first diameter;

wherein a second passage, which is transverse to said receiving bore axis, intersects said receiving bore in said second diameter, said second passage extending axially from a first uppermost edge, which is proximal to said outer surface, to a first lowermost edge, which is distal from said outer surface;

wherein a third passage, which is transverse to said receiving bore axis, intersects said receiving bore in said third diameter, said third passage extending axially from a second uppermost edge, which is proximal to said outer surface, to a second lowermost edge, which is distal from said outer surface; and wherein said second anti-tip flange is located between said second uppermost edge and said outer surface when said first sealing ring is aligned with said first lowermost edge.

2. A valve assembly as in claim 1, wherein said first anti-tip flange is aligned with said second passage when said first sealing ring is aligned with said first lowermost edge.

3. A valve assembly as in claim 2, wherein said second anti-tip flange is located between said second uppermost edge and said outer surface when said second sealing ring is aligned with said second lowermost edge of said third passage.

4. A valve assembly as in claim 3, wherein said first anti-tip flange is located in said second diameter between said first uppermost edge and said second lowermost edge when said first sealing ring is aligned with said first uppermost edge.

5. A valve assembly as in claim 3, wherein said second anti-tip flange is located within said third diameter between said second lowermost edge and said first uppermost passage when said valve assembly is fully inserted into said receiving bore.

6. A valve assembly as in claim 3, wherein said first anti-tip flange is located in said second diameter between said first lowermost edge and said first diameter when said valve assembly is fully inserted into said receiving bore.

7. A valve assembly as in claim 3, wherein said second anti-tip flange is located axially between said second uppermost edge and said outer surface when said second sealing ring is aligned with said second uppermost edge.

8. A valve assembly as in claim 1, wherein:
said first anti-tip flange is aligned with said second passage when said first sealing ring is aligned with said first lowermost edge.

9. A valve assembly as in claim 1, wherein:
said second anti-tip flange is located between said second uppermost edge and said outer surface when said second sealing ring is aligned with said second lowermost edge of said third passage.

10. A valve assembly as in claim 1, wherein:
said first anti-tip flange is located in said second diameter between said first uppermost edge and said second lowermost edge when said first sealing ring is aligned with said first uppermost edge.

11. A valve assembly as in claim 1, wherein:
said second anti-tip flange is located within said third diameter between said second lowermost edge and said first uppermost edge when said valve assembly is fully inserted into said receiving bore.

12. A valve assembly as in claim 1, wherein:
said second anti-tip flange is located axially between said second uppermost edge and said outer surface when said second sealing ring is aligned with said second uppermost edge.

13. A valve assembly as in claim 1, wherein said first sealing ring and said second sealing ring are axially aligned such that a line parallel to said valve housing axis passes through both said first sealing ring and said second sealing ring.

14. A valve assembly as in claim 13, wherein:
said valve housing also includes a third annular groove on said outer periphery such that said third annular groove is centered about said valve housing axis and such that a third sealing ring is provided in said second annular groove and configured to engage said third diameter, thereby sealing said third port from said outer surface at said outer periphery, said third annular groove being bounded axially by a third lower annular groove flange and a third upper annular groove flange; and said second sealing ring and said third sealing ring are axially aligned such that said line passes through both said second sealing ring and said third sealing ring.

15. A valve assembly as in claim 14, wherein said first sealing ring and said third sealing ring are axially aligned such that said line passes through both said first sealing ring and said third sealing ring.

16. A valve assembly as in claim 1, wherein said valve housing includes a plurality of ribs which are circumferentially spaced such that each of said plurality of ribs extend from said second upper annular groove flange to said second anti-tip flange.

17. A valve assembly as in claim 1, wherein said valve housing includes a plurality of ribs which are circumferentially spaced such that each of said plurality of ribs extend from said first upper annular groove flange to said first anti-tip flange.

18. A valve assembly configured to be received within a receiving bore which extends along a receiving bore axis from an outer surface to a receiving bore inner end, said receiving bore being stepped in diameter such that a first diameter which is proximal to said receiving bore inner end is smaller in diameter than a second diameter which is axially between said first diameter and said outer surface and such that a third diameter which is axially between said second diameter and said outer surface is larger in diameter than said second diameter, said valve assembly comprising:

a valve housing which is configured to be received within said receiving bore and which extends along a valve housing axis from a valve housing inner end, which is proximal to said receiving bore inner end when said valve housing is in said receiving bore, to a valve housing outer end which is distal from said receiving bore inner end when said valve housing is in said receiving bore, said valve housing having a first port, a second port, and a third port;

a valve member within said valve housing which is moveable therein, thereby providing different levels of fluid communication between said first port and said second port;

wherein said valve housing also includes:

a first annular groove on an outer periphery of said valve housing such that said first annular groove is centered about said valve housing axis and such that a first sealing ring is provided in said first annular groove and configured to engage said first diameter, thereby sealing said first port from said second port at said outer periphery, said first annular groove being bounded axially by a first lower annular groove flange and a first upper annular groove flange;

a second annular groove on said outer periphery such that said second annular groove is centered about said valve housing axis and such that a second sealing ring is provided in said second annular groove and configured to engage said second diameter, thereby sealing said second port from said third port at said outer periphery, said second annular groove being bounded axially by a second lower annular groove flange and a second upper annular groove flange;

a first anti-tip flange which extends radially outward from said outer periphery to a greater extent than said first lower annular groove flange and said first upper annular groove flange, said first anti-tip flange being located axially between said first annular groove and said second annular groove; and a second anti-tip flange which extends radially outward from said outer periphery to a greater extent than said second lower annular groove flange and said second upper annular groove flange, said second anti-tip flange being located axially between said first annular groove and said valve housing outer end;

wherein said valve housing includes a plurality of ribs which are circumferentially spaced such that each of said plurality of ribs extend from said second upper annular groove flange to said second anti-tip flange.

19. A valve assembly configured to be received within a receiving bore which extends along a receiving bore axis from an outer surface to a receiving bore inner end, said receiving bore being stepped in diameter such that a first diameter which is proximal to said receiving bore inner end is smaller in diameter than a second diameter which is axially between said first diameter and said outer surface and such that a third diameter which is axially between said second diameter and said outer surface is larger in diameter than said second diameter, said valve assembly comprising:

a valve housing which is configured to be received within said receiving bore and which extends along a valve housing axis from a valve housing inner end, which is proximal to said receiving bore inner end when said valve housing is in said receiving bore, to a valve housing outer end which is distal from said receiving bore inner end when said valve housing is in said receiving bore, said valve housing having a first port, a second port, and a third port;

a valve member within said valve housing which is moveable therein, thereby providing different levels of fluid communication between said first port and said second port;

wherein said valve housing also includes:

a first annular groove on an outer periphery of said valve housing such that said first annular groove is centered about said valve housing axis and such that a first sealing ring is provided in said first annular groove and configured to engage said first diameter, thereby sealing said first port from said second port at said outer periphery, said first annular groove being bounded axially by a first lower annular groove flange and a first upper annular groove flange;

a second annular groove on said outer periphery such that said second annular groove is centered about said valve housing axis and such that a second sealing ring is provided in said second annular groove and configured to engage said second diameter, thereby sealing said second port from said third port at said outer periphery, said second annular groove being bounded axially by a second lower annular groove flange and a second upper annular groove flange;

a first anti-tip flange which extends radially outward from said outer periphery to a greater extent than said first lower annular groove flange and said first upper annular groove flange, said first anti-tip flange being located axially between said first annular groove and said second annular groove; and a second anti-tip flange which extends radially outward from said outer periphery to a greater extent than said second lower annular groove flange and said second upper annular groove flange, said second anti-tip flange being located axially between said first annular groove and said valve housing outer end;

wherein said valve housing includes a plurality of ribs which are circumferentially spaced such that each of said plurality of ribs extend from said first upper annular groove flange to said first anti-tip flange.

* * * * *